(12) United States Patent
Hedlund (10) Patent No.: US 6,431,561 B1
(45) Date of Patent: Aug. 13, 2002

(54) SNOWMOBILE WITH ASYMMETRIC SKIS

(75) Inventor: Jan M. Hedlund, Roseau, MN (US)

(73) Assignee: Polaris Industries Inc., Medina, MN (US)

( * ) Notice: Subject to any disclaimer, the term of this patent is extended or adjusted under 35 U.S.C. 154(b) by 0 days.

(21) Appl. No.: 09/433,183

(22) Filed: Nov. 3, 1999

(51) Int. Cl.[7] ............................................. B62M 11/00
(52) U.S. Cl. ......................... 280/28; 280/22; 280/22.1
(58) Field of Search .............................. 180/182, 184, 180/186, 190; 280/21.1, 22, 22.1, 28, 28.14, 28.16, 601, 609

(56) References Cited

U.S. PATENT DOCUMENTS

| | | | |
|---|---|---|---|
| 878,326 A | | 2/1908 | Abelson |
| 1,957,372 A | | 5/1934 | Thompson .................... 280/28 |
| 3,482,849 A | * | 12/1969 | Puetz .......................... 280/28 |
| 3,501,160 A | * | 3/1970 | Lange ......................... 280/609 |
| 3,645,347 A | | 2/1972 | Brant ............................ 180/5 |
| 3,942,812 A | | 3/1976 | Kozlow ........................ 280/28 |
| 4,491,333 A | | 1/1985 | Warnke ........................ 280/28 |
| 4,509,766 A | * | 4/1985 | Yasui et al. ................. 280/21.1 |
| 4,826,201 A | * | 5/1989 | Varan et al. ................. 280/609 |
| 4,895,388 A | * | 1/1990 | Richmond ................... 280/601 |
| 5,145,195 A | | 9/1992 | Campbell et al. ............. 280/28 |
| 5,145,201 A | * | 9/1992 | Metheny ..................... 280/609 |
| 5,405,161 A | * | 4/1995 | Petkov ........................ 280/609 |
| 5,443,278 A | | 8/1995 | Berto .......................... 280/28 |
| 5,599,030 A | | 2/1997 | Campbell et al. ............. 280/28 |
| 5,649,722 A | * | 7/1997 | Champlin .................. 280/14.22 |
| 5,700,020 A | | 12/1997 | Noble .......................... 280/28 |
| 6,276,699 B1 | * | 8/2001 | Simmons et al. ............. 280/28 |

FOREIGN PATENT DOCUMENTS

| | | | | |
|---|---|---|---|---|
| JP | 2000043735 A | * | 2/2000 | ........... B62B/13/08 |
| JP | 2000289684 A | * | 10/2000 | .......... B62M/27/02 |

* cited by examiner

*Primary Examiner*—Lanna Mai
*Assistant Examiner*—Paul Royal, Jr.
(74) *Attorney, Agent, or Firm*—Fredrikson & Byron, P.A.

(57) ABSTRACT

A snowmobile having asymmetrical, high floatation skis. The snowmobile includes left and right steerable skis carried by a front suspension system that in turn is mounted to the snowmobile's chassis. Each ski has a downwardly extending longitudinal keel, and inner and outer floatation portions extending laterally from the keel. The inner floatation portion of each ski is wider than the outer floatation portion of such ski, making the ski asymmetrical with respect to the keel and giving the ski greater floatation without increasing the overall width of the snowmobile. Preferably the front suspension system includes left and right generally downwardly and forwardly extending spindles, each spindle carrying at its lower end the corresponding ski. The spindles define the steering axes for their respective skis. Preferably the steering axis of the spindle passes through the keel. The angle of the spindles in combination with the asymmetrical skis causes the ski on the inside of a turn to lose floatation in comparison to the outer ski, thus causing the snowmobile to lean into the turn.

24 Claims, 7 Drawing Sheets

SNOWMOBILE WITH ASYMMETRIC SKIS

TECHNICAL FIELD

The invention relates to snowmobiles, and, in particular, to snowmobiles have asymmetrical skis.

BACKGROUND OF THE INVENTION

Snowmobiles are unique vehicles with respect to the way in which they engage the ground. Unlike cars, trucks, motorcycles, and just about every other type of land vehicle, they have no ground-engaging wheels. And, unlike other tracked vehicles such as military tanks or earth-moving caterpillars, the track of a snowmobile is not involved in steering—just propulsion.

The steering of a snowmobile is accomplished by its two front skis. The skis of a snowmobile actually perform two functions, however. Not only are they the only means for steering the vehicle, but they also must provide "floatation" for the front of the snowmobile—i.e., being the forward most ground-engaging structure on the snowmobile, they must cause the snowmobile to ride up on top of the snow. In hard-packed snow, groomed trails, or icy conditions, floatation is usually not an issue. In fresh snow or off-trail riding (common conditions, e.g., in mountain riding), however, the ability of the skis to keep the front end of the snowmobile from sinking too deeply in the snow is important for a pleasurable riding experience.

These two functions of the skis, steering and floatation, can be at odds with each other when it comes to designing the physical configuration of a ski. Better floatation is achieved by making the ski relatively flat on the bottom, and relatively wide. Such a ski profile, however, does not provide much "bite" for steering purposes. In groomed trail, hard packed snow, and ice conditions, a relatively shallow keel on the bottom of the ski, in combination with a conventional steering skag, typically provides sufficient bite for effective steering. In deep powder conditions, however, it is desirable to have a much deeper keel for more effective steering. A deeper keel typically also requires the keel to be wider at its base, but the wider and deeper the keel is, the less flat the skis profile becomes; consequently, the ski gives less floatation.

Simply making the ski wider usually is not practical. Most snowmobile manufacturers already make the ski stance (i.e., the front suspension system) the widest part of the snowmobile (providing good stability), and a very practical limit on a snowmobile's width is the desire of users to place two snowmobiles side by side—ski to ski—on a conventional width trailer. Thus, simply widening the ski may interfere with users'ability to utilize conventional trailers.

Thus, compromises must be made between the floatation and steering characteristics of skis in such powder conditions.

SUMMARY OF THE INVENTION

The invention provides a snowmobile having asymmetrical skis, which provide increased floatation without sacrificing keel depth and without increasing the overall width of the snowmobile.

A snowmobile of the invention includes a chassis, a straddle-type seat mounted to the chassis, a pair of handlebars carried by the chassis adjacent to the seat, and an endless track carried by a rear suspension system mounted to the chassis. The snowmobile includes left and right steerable skis carried by a front suspension system that in turn is mounted to the chassis, the skis being steerably connected to the handlebars. Each ski has a longitudinal length more than twice as long as its width, a downwardly extending longitudinal keel, and inner and outer floatation portions extending laterally from the keel. The inner floatation portion of each ski is wider than the outer floatation portion of such ski, making the ski asymmetrical with respect to the keel.

Preferably the front suspension system includes left and right generally downwardly and forwardly extending spindles. Each spindle has a lower end and is rotatable around a steering axis. The left and right skis are carried, respectively, at the lower ends of the left and right spindles. Each ski is aligned with its spindle such that the steering axis of the spindle passes through the keel.

This configuration provides an added benefit when the snowmobile turns a corner. The forward angle of the spindles causes the skis to tilt in the direction that they are being turned. Thus, in a left-hand turn, the skis tilt to the left. This tends to raise the inner floatation portion of the left ski, giving it less floatation, while lowering the inner floatation portion of the right ski, maintaining its floatation. The net effect is to cause the snowmobile to lean into the turn, an advantageous performance characteristic.

DETAILED DESCRIPTION OF THE INVENTION

Figure 1:
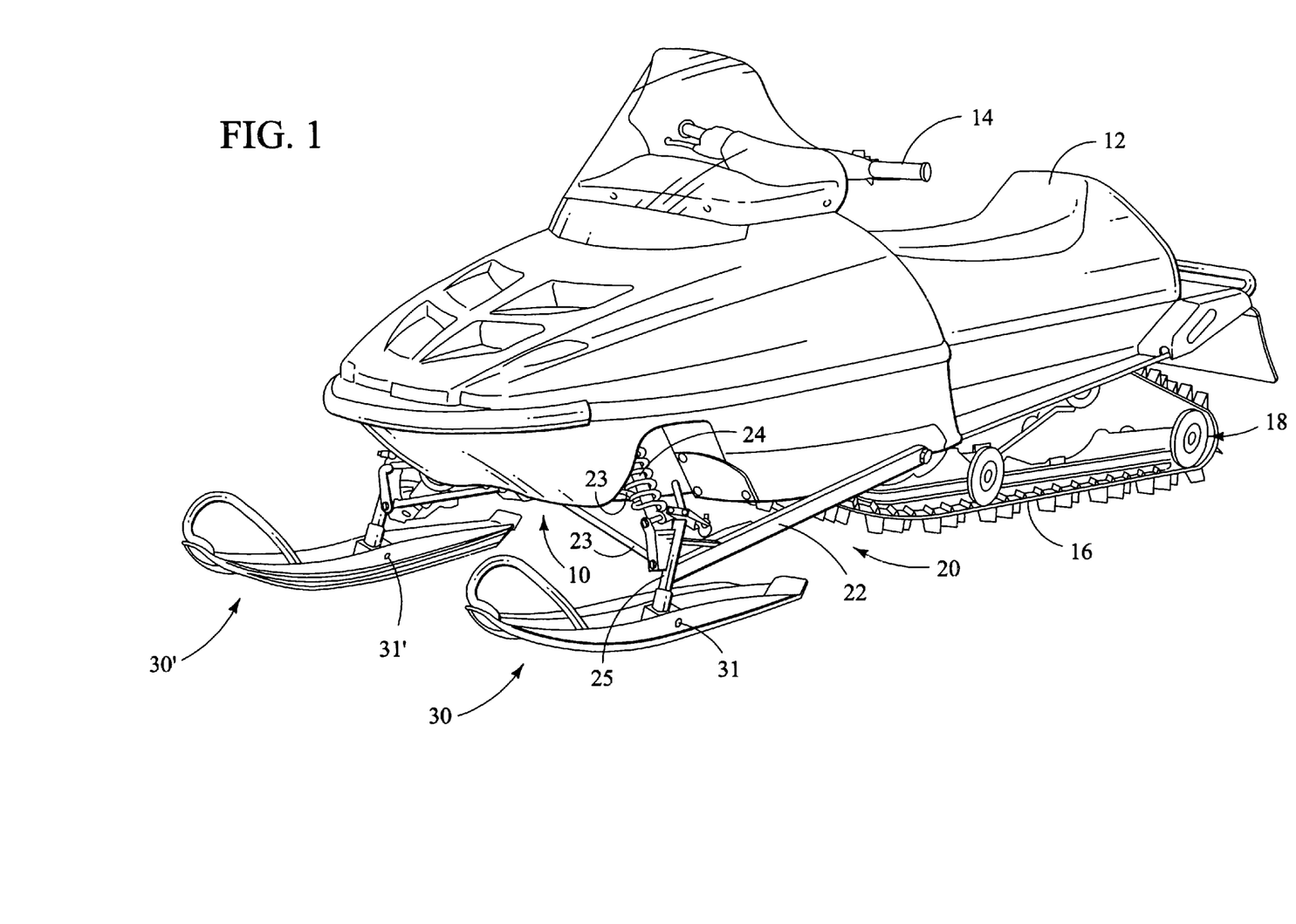
FIG. 1 is a perspective view of a snowmobile of the invention.

FIG. 1 depicts a snowmobile of the invention. The snowmobile includes a chassis 10, a straddle type seat 12 mounted to the chassis 10, and a pair of handlebars 14 carried by the chassis 10 adjacent to the seat 12 so that a rider sitting in straddle fashion on the seat may steer the snowmobile using the handlebars 14. The snowmobile includes an endless track 16 carried by a rear suspension system 18 mounted to the chassis 10, the endless track being connected to and powered by the snowmobile's engine (typically located beneath the hood near the front of the snowmobile).

Left and right steerable skis 30 and 30' are carried by a front suspension system 20 which in turn is mounted to the chassis 10. The suspension system may be of any suitable type. In the drawings a trailing arm suspension system is depicted, such a system utilizing, for each ski, a trailing arm 22 connected at its rear end to the chassis, a pair of generally transversely mounted radius rods 23 connected at their inner ends to the chassis and at their outer ends to the front end of the trailing arm, and a shock/spring combination 24 connected at one end to the chassis 10 and at the other end to the front end of the trailing arm 22. Other suitable suspensions could also be utilized, however, including, e.g., a double A-arm (sometimes called "double wishbone") suspension or a telescopic strut suspension.

Each ski 30, 30' is connected to the front suspension system by a spindle. The ski spindle is pivotally connected at its lower end to the ski by a transverse pivot pin (such as a bolt 31 or a similar connector) which permits the ski to pivot about a transverse horizontal axis H (see FIG. 7). The spindle itself is not visible in the drawings, as it is rotatably received within a spindle sleeve 25 carried by the front end of the trailing arm 22 (other types of suspensions may have other functionally equivalent pivotal linkages connecting the ski spindle to the suspension system). The spindle is rotatable within the spindle sleeve 25 about a steering axis "S" as the rider steers the snowmobile. Preferably the spindle and spindle sleeve 25 are angled downwardly and forwardly (i.e., the bottom end of the spindle is located forward of the top end of the spindle), thus defining a castor angle of the spindle.

The ski spindles are connected through a conventional steering linkage to the handlebars 14 so that the operator may steer the snowmobile by turning the handlebars 14. Any suitable mechanical connection between the handlebars 14 and the skis may be utilized for this purpose.

FIGS. 2–6 show details of the configuration of the skis 30, 30'. As the right ski 30' is simply a mirror image of the left ski 30, description of the configuration of the skis will be made with reference to the left ski 30 (reference numbers for the right ski 30' correspond to the left ski 30, but are separately identified by the prime mark). Each ski 30 has a longitudinal length more than twice its width-in the preferred embodiment shown in the drawings the skis are about six times as long as they are wide. Viewed in cross section, each ski 30 has a downwardly extending longitudinal keel 32, and inner and outer floatation portions, 44 and 45, extending laterally from the keel 32. A pair of reinforcing webs 37 extend upwardly from the ski. Holes 39 are provided for mounting the bottom end of the spindle to the ski (the holes 39 in the preferred embodiment shown in the drawings are relatively large as this ski is preferably molded from a plastic, such as ultra high molecular weight polyetheylene, and the hole is sized to receive a bushing within which the transverse spindle pivot bolt 31 is received; the ski may be made from other suitable materials as well, however, such as metal or other suitable plastics).

Figure 2:
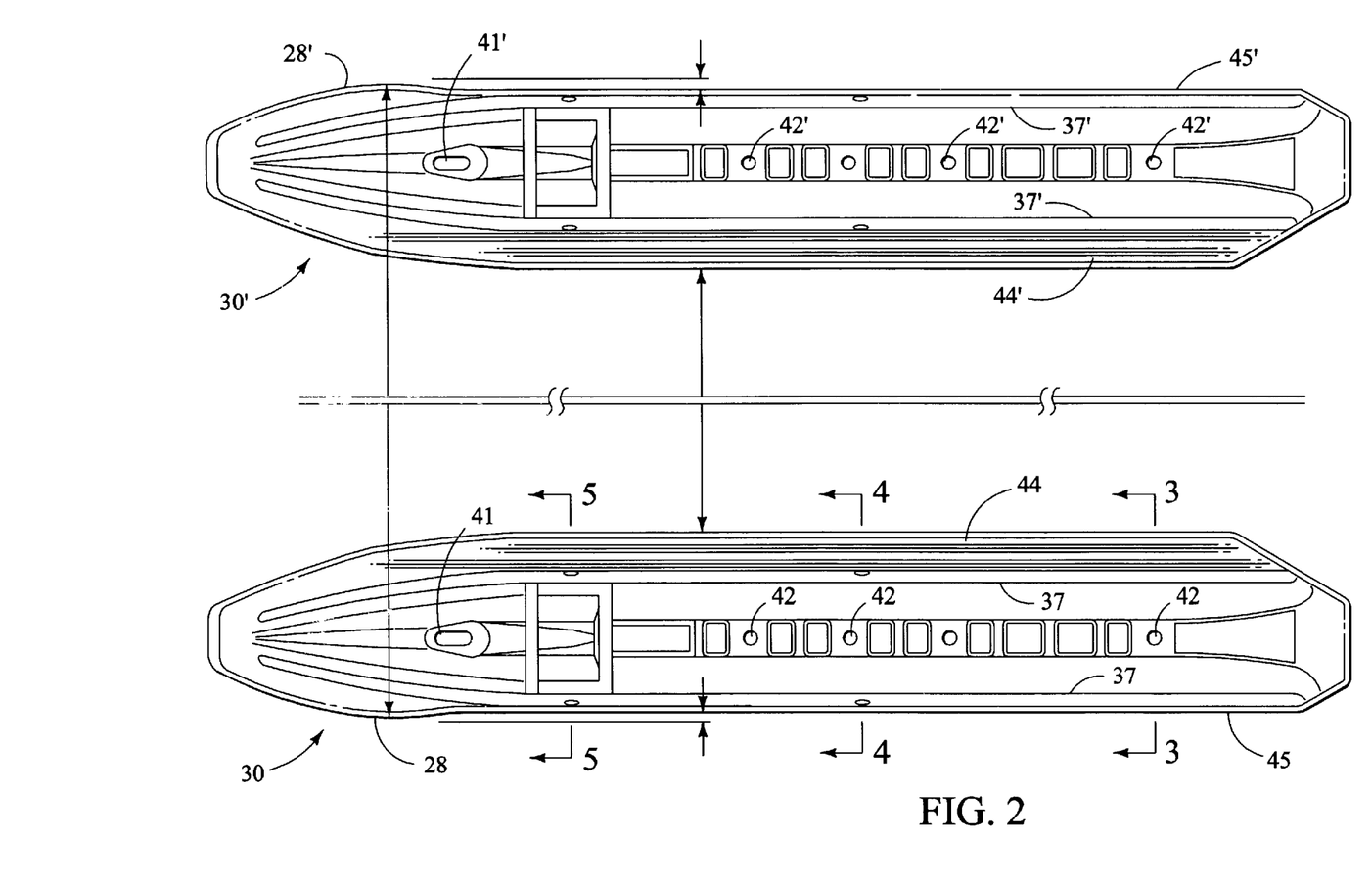
FIG. 2 is a top view of a pair of snowmobile skis of the invention.

A conventional longitudinally extending ski skag 34 preferably is mounted to the bottom surface of the ski 30 for reducing wear on the keel 32. Such skags typically have a front end that is protected by extending up through the ski keel 32 through an orifice 41 near the front of the ski 30. Such skags also typically include several upwardly extending threaded rods for securing the skag 34 to the ski 30—such threaded rod portions extend upwardly through holes 42 in the keel portion of the ski, being secured by a nut 36 or similar fastener.

In contrast to the generally symmetrical configuration of most snowmobile skis, in the present invention the inner floatation portion 44 of each ski is wider than the outer floatation portion 45 of the ski 30. That is, the inner floatation portion 44 extends further laterally from the "center" of the ski than does the outer floatation portion 45—the "center" of the ski, for purposes of this discussion, may be defined to as lying along a longitudinal axis "L" of the ski 30, such axis "L" intersecting the steering axis "S" (i.e., the axis about which the spindle rotates). In the ski 30 shown in the drawings, the steering axis "S" passes through the center of the keel 32, thus causing the longitudinal axis "L" of the ski 30 to lie along the center of the keel 32. The keel 32 does not have to be centered on the steering axis "S" and the longitudinal axis "L", but such placement of the keel facilitates easy steering of the snowmobile.

Preferably the inner floatation portion 44 of each ski includes primary and secondary portions 47 and 48. The primary portion 47 preferably is generally symmetrical (along at least half of its length, and preferably its entire length) with respect to the outer floatation portion 45 of the ski 30, such symmetry being about a vertical plane containing a longitudinal axis "L" of the ski 30. The secondary portion 48 extends laterally inwardly (i.e., toward the center of the snowmobile) from the primary portion 47. The secondary portion 48 thus is non-symmetrical with respect to the outer floatation portion 45 of the ski. Preferably the secondary portion 48 of each ski 30 is angled slightly inwardly upwardly.

Figure 3:
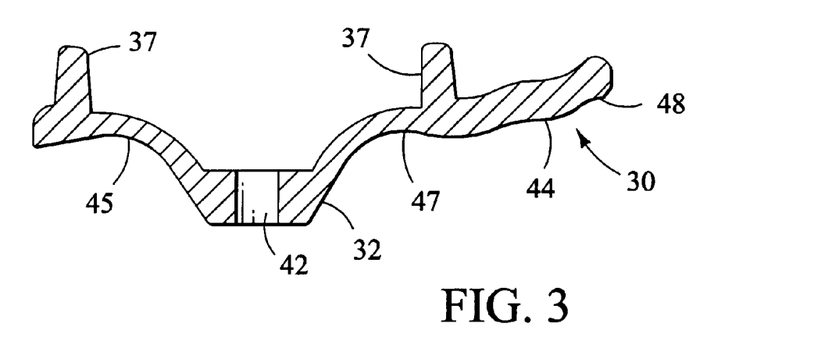
FIG. 3 is a transverse cross-sectional view of FIG. 2, taken along lines 3—3 thereof.
Figure 4:
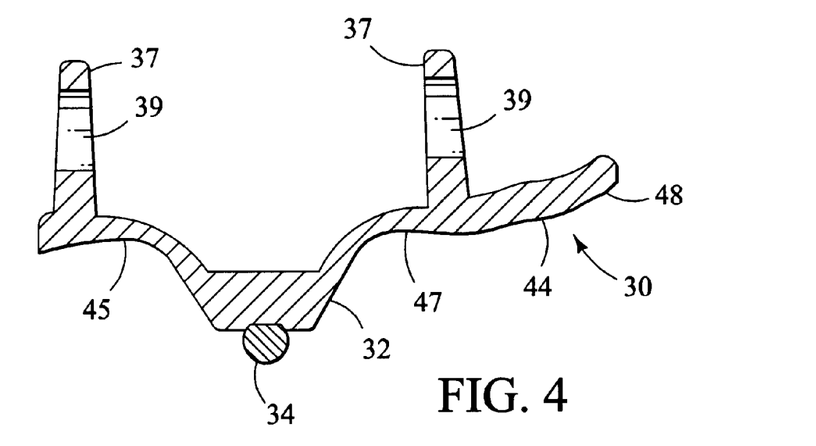
FIG. 4 is a transverse cross-sectional view of FIG. 2, taken along lines 4—4 thereof.
Figure 5:
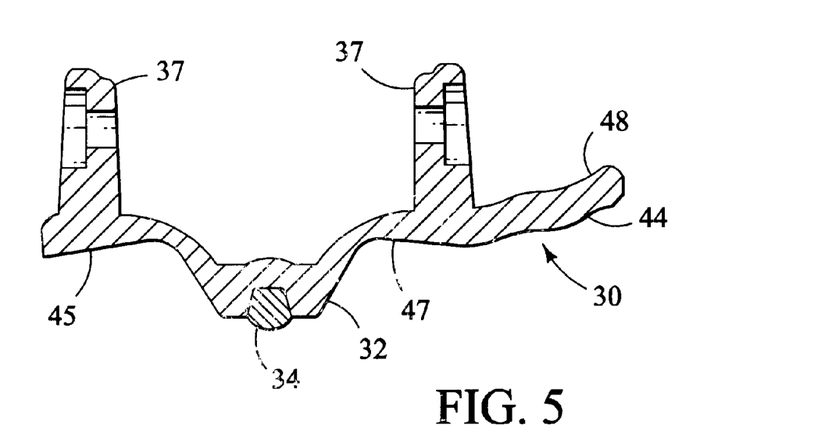
FIG. 5 is a transverse cross-sectional view of FIG. 2, taken along lines 5—5 thereof.
Figure 6:
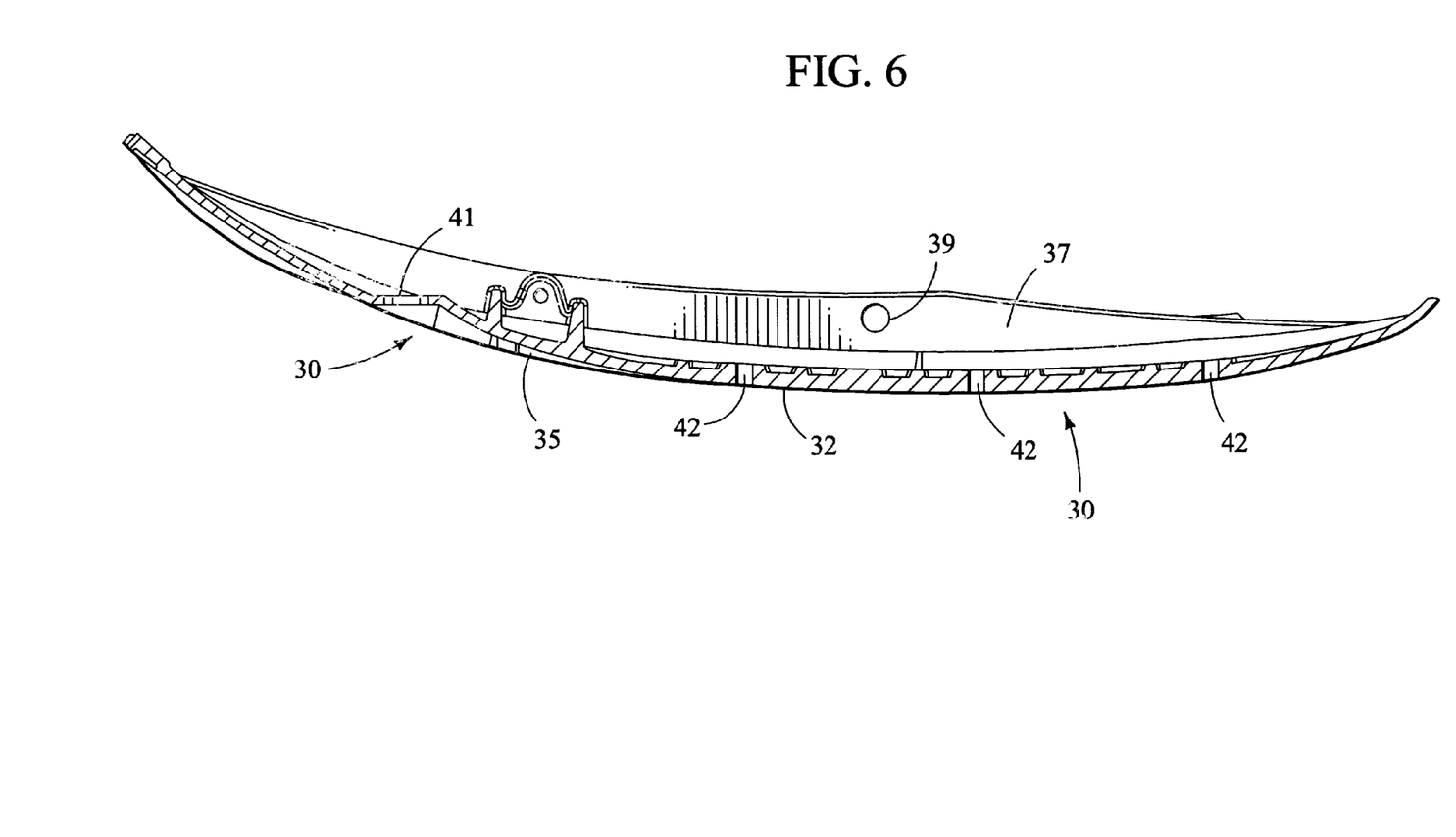
FIG. 6 is a longitudinal cross-sectional view of FIG. 2.
Figure 7:
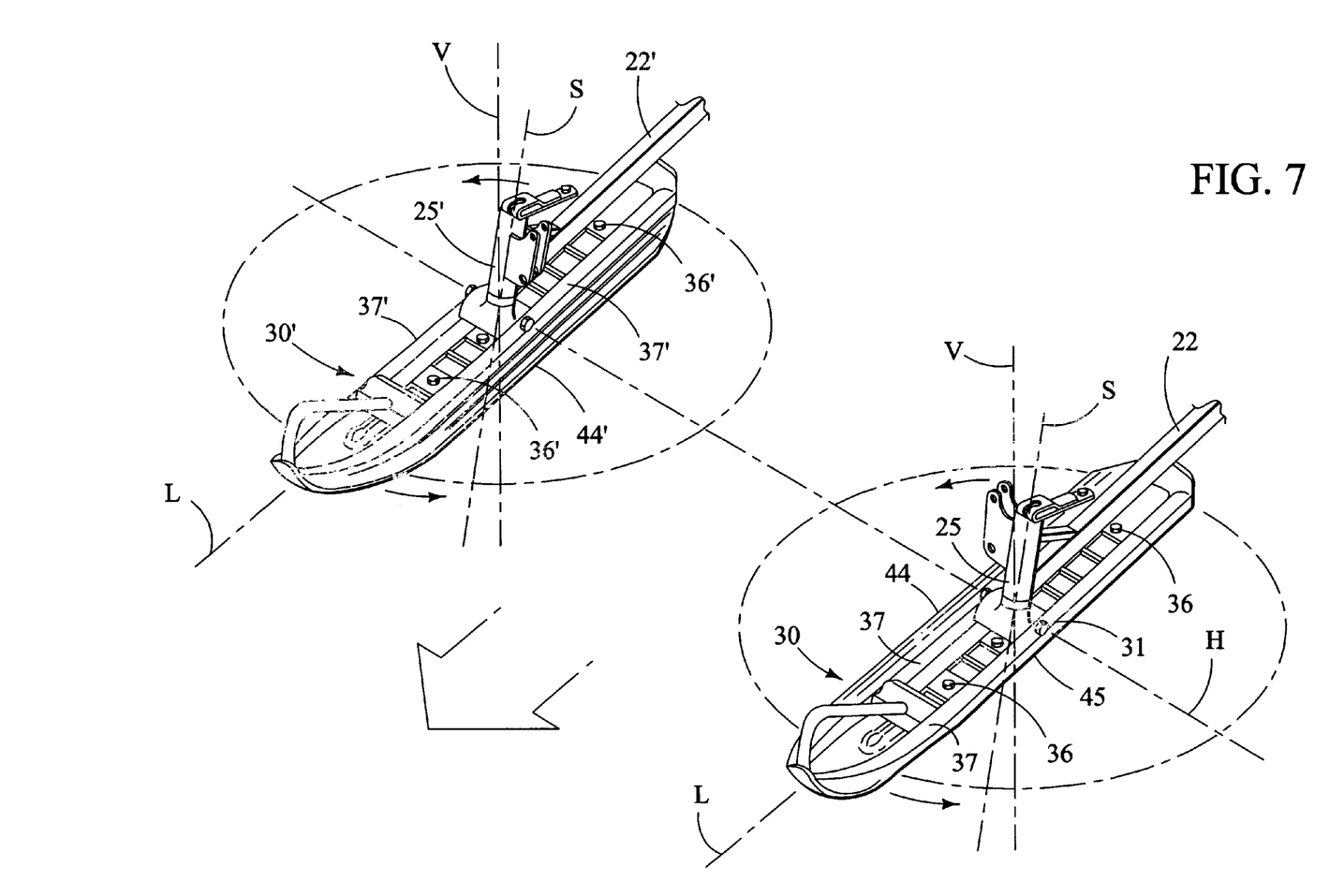
FIG. 7 is a perspective, diagrammatic view of the skis of the invention traveling straight in snow.

Desirably the inner floatation portion 44 is at least a half-inch wider than the outer floatation portion 45, and preferably the inner floatation 44 portion is more than an inch wider than the outer floatation portion 45. In the preferred embodiment shown in the drawings, the overall length of the ski is about 40 inches, the width of the ski at the cross-sections shown in FIGS. 3–5 is 6.25 inches, with the inner floatation portion 44 being about 1.4 inches wider than the outer floatation portion 45. The bottom of the keel 32 in this embodiment is about one inch wide. As can be seen in FIGS. 2 and 7, the width of the ski 30 normally tapers inwardly near the front and rear ends of the ski 30; thus, the extra width of the inner floatation portion 44 does not extend for the entire length of the ski 30. Desirably, however, the inner floatation portion 44 is wider than the outer floatation portion 45 along at least half of the length of the ski, and preferably it is at least one-half inch wider for at least one-third of the overall length of the ski 30.

FIG. 2 also illustrates a slight outward bow 28, near the front of the ski 30, in the outer edge of the ski 30. This outward bow 28 helps to reduce snow spray when the snowmobile is ridden through powder.

Figure 8:
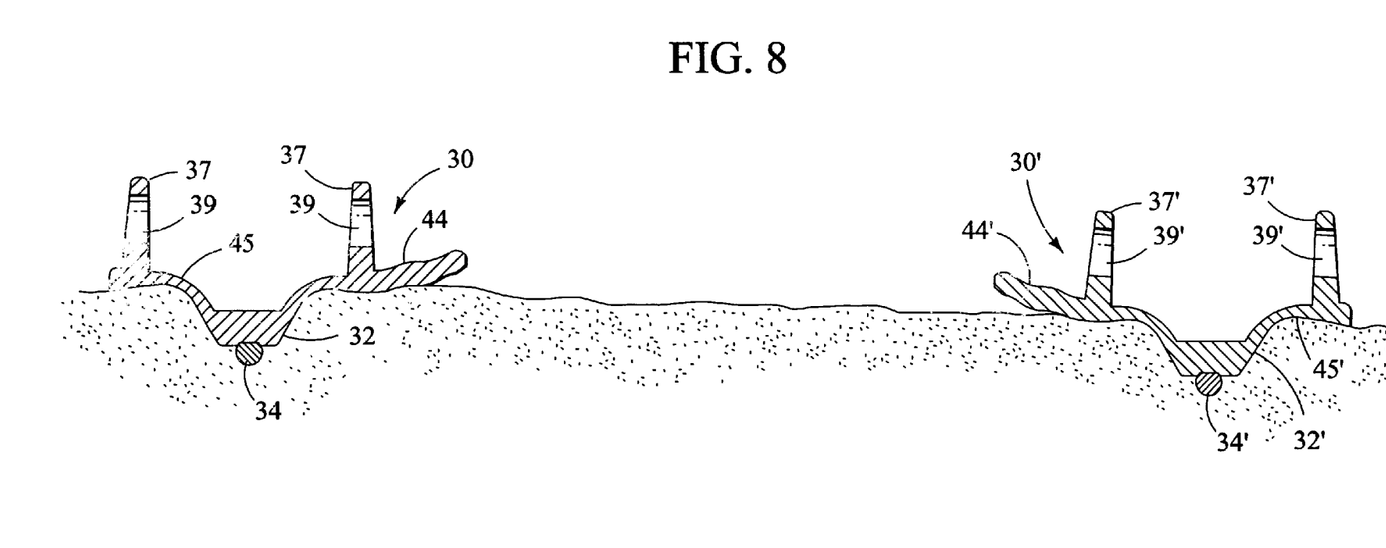
FIG. 8 is a cross-sectional view of FIG. 7 showing the skis traveling in snow.
Figure 9:
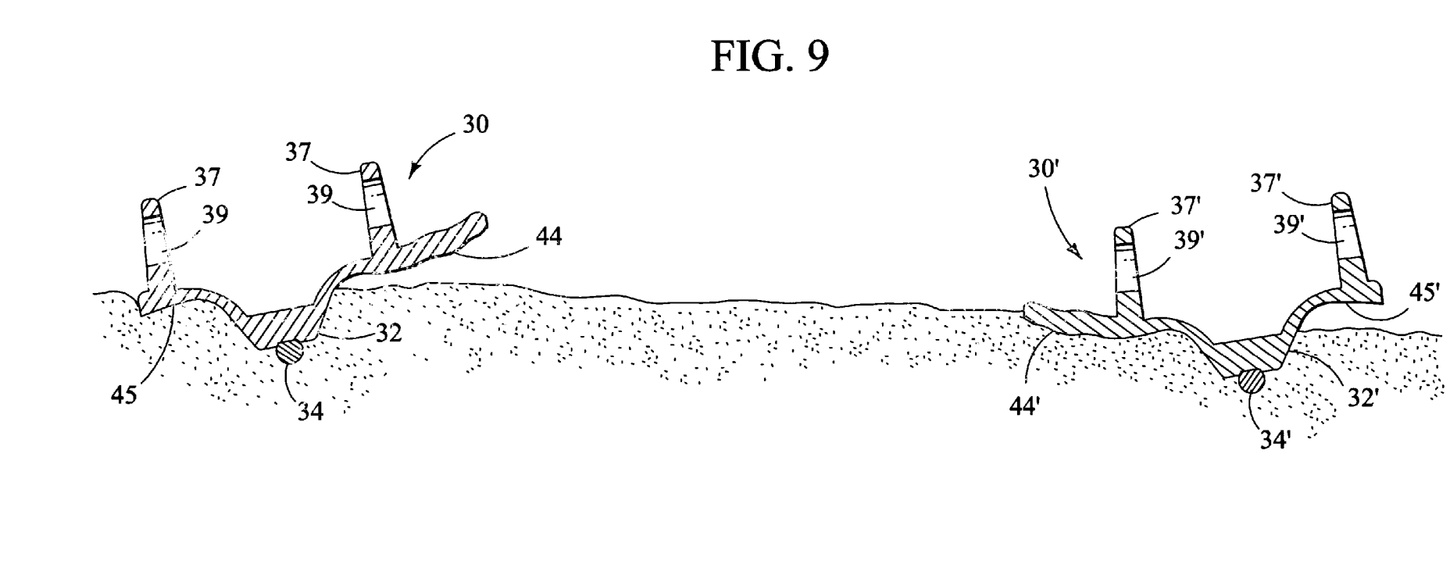
FIG. 9 is a cross-sectional view similar to FIG. 8, showing the skis making a left-hand turn in the snow.

FIGS. 7–9 illustrate the performance advantages realized by the invention. FIGS. 7–8 show a pair of skis of the invention traveling through snow in a generally straight direction. As can be seen from these figures, the added width of the inner floatation portion 44 of the skis provides added floatation for the skis, and, hence, the snowmobile, as it travels across the snow. (FIG. 8 is somewhat schematic in its representation of the depth of the ski in the snow—obviously the actual depth will depend upon a variety of conditions including how "powdery" the snow is.)

FIG. 7 also illustrates the castor angle of the spindle, which, in combination with the wider inner floatation portion 44 of the skis, provides additional performance advantages. The spindle and spindle sleeve 25 are tipped back from the vertical so that the steering axis "S" forms an angle with a vertical line "V" shown in FIG. 7. This castor angle causes the skis to tip, with respect to their longitudinal axes "L", when the rider executes a turn. FIG. 8 shows the skis traveling straight through the snow, and FIG. 9 shows how the skis tip to the left as the rider executes a left-hand turn. The degree of tip is dependent on the castor angle of the ski spindle, and is slightly exaggerated in FIG. 9 for the sake of illustration. Notice, however, in FIG. 9, that the inner floatation portion 44 of the left ski is lifted upwardly, making it less effective in providing floatation, while the outer floatation portion 45 of the left ski, being tipped downwardly, is providing most of the floatation for the left ski. In contrast, the inner floatation portion 44' of the right ski has been tipped downwardly, providing significant floatation, while the outer floatation portion 45' of the right ski is lifted upwardly, making it less effective in providing floatation. Thus, in the position shown in FIG. 9, the right ski 30' is providing more floatation than the left ski 30. Since this is a left-hand turn, the net result is that the left ski 30, being on the inside of this turn, sinks into the snow a little bit more than the right ski 30', which is on the outside of the turn, thus causing the snowmobile to lean into the turn a little bit-a desirable performance characteristic. This characteristic is enhanced slightly by forming the inner floatation portion to be angled inwardly upwardly.

While a preferred embodiment of the present invention has been described, it should be understood that various changes, adaptations and modifications may be made therein without departing from the spirit of the invention and the scope of the appended claims.

What is claimed is:

1. A snowmobile comprising:
   a chassis;
   a straddle-type seat mounted to the chassis;
   a pair of handlebars carried by the chassis adjacent to the seat;
   an endless track carried by a rear suspension system mounted to the chassis;
   a front suspension system mounted to the chassis and including left and right generally downwardly and forwardly extending spindles, each spindle having a lower end; and
   left and right steerable skis carried by the front suspension system, the skis being steerably connected to the handlebars, each ski having a longitudinal length more than twice as long as its width, a downwardly extending longitudinal keel, and inner and outer floatation portions extending laterally of the keel, the floatation portions elevated higher than a bottom surface of the keel, the inner floatation portion of each ski being at least one-half inch wider than the outer floatation portion of such ski along at least one-third of the ski's length, the left and right skis carried, respectively, at the lower ends of the left and right spindles such that the left ski inner floatation portion is adjacent to the right ski inner floatation portion.

2. The snowmobile of claim 1 wherein the front suspension system includes left and right spindles extending upwardly and rearwardly from the left and right skis.

3. The snowmobile of claim 2 wherein each spindle is pivotally connected at its lower end to its corresponding ski by a transverse pivot pin which permits the ski to pivot about a transverse horizontal axis.

4. The snowmobile of claim 1 wherein the inner floatation portion of each ski is angled inwardly upwardly.

5. The snowmobile of claim 1 wherein the inner floatation portion of each ski includes:
   a primary portion that is generally symmetrical along at least half of its length with respect to the outer floatation portion of the ski, such symmetry being about a vertical plane passing through a longitudinal axis of the ski, and
   a secondary portion extending laterally inwardly from the primary portion, the secondary portion being non-symmetrical with respect to the outer floatation portion of the ski.

6. The snowmobile of claim 5 wherein the secondary portion of each ski is angled inwardly upwardly.

7. The snowmobile ski of claim 1, wherein the outer floatation portion of each ski includes an outward bow near the front of the ski.

8. The snowmobile ski of claim 1, wherein the outer floatation portion of each ski.

9. A snowmobile comprising:
   a chassis;
   a straddle-type seat mounted to the chassis;
   a pair of handlebars carried by the chassis adjacent to the seat;
   an endless track carried by a rear suspension system mounted to the chassis;
   a front suspension system including left and right generally downwardly and forwardly extending spindles, each spindle having a lower end and being rotatable around a steering axis, the steering axis being defined by the center of rotation of the spindle; and
   left and right skis each ski having a longitudinal length and a longitudinal axis that intersects the steering axis of the corresponding spindle, and inner and outer floatation portions extending upward from a bottom surface of the ski and laterally from the longitudinal axis of such ski, the inner floatation portion of each ski including a primary portion and a secondary portion, the left and right skis carried, respectively, at the lower ends of the left and right spindles such that the left ski inner floatation portion is adjacent to the right ski inner floatation portion,
   the primary portion of each ski being generally symmetrical along at least half of its length with respect to the outer floatation portion of such ski, such symmetry being about a vertical plane passing through the longitudinal axis of such ski, and
   the secondary portion of each ski extending laterally inwardly from the primary portion of such ski and being non-symmetrical with respect to the outer floatation portion of such ski about the vertical plane, the secondary portion of each ski angled inwardly upwardly and extending further laterally away from a side of the vertical plane than such ski extends away from an opposite side of the vertical plane.

10. The snowmobile of claim 9, wherein the inner floatation portion of each ski is at least one-half inch wider than the outer floatation portion of such ski along at least one-third of the ski's length.

11. The snowmobile of claim 10, wherein each ski includes reinforcing webs extending upwardly from such ski.

12. The snowmobile of claim 10, wherein the secondary portion of each ski is angled inwardly upwardly from the primary portion of such ski.

13. The snowmobile of claim 9, wherein each spindle is pivotally connected at its lower end to its corresponding ski by a transverse pivot pin which permits the ski to pivot about a transverse horizontal axis.

14. The snowmobile of claim 9, wherein each ski includes a downwardly extending longitudinal keel, the inner and outer floatation portions extending laterally from opposite sides of the keel.

15. The snowmobile ski of claim 9, wherein the outer floatation portion of each ski includes an outward bow near the front of the ski.

16. The snowmobile of claim 9, wherein the inner floatation portion of each ski is angled inwardly upwardly.

17. A snowmobile comprising:

a chassis;

a straddle-type seat mounted to the chassis;

a pair of handlebars carried by the chassis adjacent to the seat;

an endless track carried by a rear suspension system mounted to the chassis;

a front suspension system mounted to the chassis and including left and right generally downwardly and forwardly extending spindles, each spindle having a lower end; and left and right steerable skis carried by a front suspension system which in turn is mounted to the chassis, the skis being steerably connected to the handlebars, each ski having a longitudinal length more than twice as long as its width, upwardly extending reinforcing ribs, a downwardly extending longitudinal keel, a skag mounted to the bottom of the keel, and inner and outer floatation portions extending laterally of the keel, the floatation portions elevated higher than a bottom surface of the keel, the inner floatation portion of each ski being at least one-half inch wider than the outer floatation portion of such ski along at least one-third of the ski's length, the left and right skis carried, respectively, at the lower ends of the left and right spindles such that the left ski inner floatation portion is adjacent to the right ski inner floatation portion.

18. The snowmobile of claim 17, wherein the inner floatation portion of each ski includes a portion angled inwardly upwardly.

19. The snowmobile of claim 17, wherein the inner floatation portion of each ski includes a primary portion and a secondary portion, the secondary portion angling inwardly upwardly from the primary portion.

20. The snowmobile of claim 17, wherein the inner floatation portion of each ski includes a primary and secondary portions, the secondary portion being positioned inwardly and upwardly of the primary portion.

21. A snowmobile comprising:

a chassis;

a straddle-type seat mounted to the chassis;

a pair of handlebars carried by the chassis adjacent to the seat;

an endless track carried by a rear suspension system mounted to the chassis;

a front suspension system mounted to the chassis and including left and right generally downwardly and forwardly extending spindles, each spindle having a lower end; and left and right steerable skis, the skis being steerably connected to the handlebars, each ski having a longitudinal length more than twice as long as its width, a floatation portion, and a longitudinal keel extending downward from the floatation portion and having a longitudinal axis running laterally centrally through the keel, the floatation portion of each ski having a primary inner portion extending laterally of the keel and elevated higher than a bottom surface of the keel, the floatation portion of each ski having a secondary inner portion positioned laterally inwardly and upwardly of the primary inner portion, each ski extending further laterally inward from a vertical plane passing through the longitudinal keel axis than the ski extends laterally outward from the vertical plane, the left and right skis carried, respectively, at the lower ends of the left and right spindles such that the left ski floatation portion is adjacent to the right ski floatation portion.

22. The snowmobile of claim 21, wherein each ski extends at least one-half inch further laterally inwardly about the vertical plane containing the respective longitudinal keel axis than such ski extends laterally outward from the vertical plane along at least one-third such ski's length.

23. The snowmobile of claim 22, wherein the floatation portion of each ski includes an outer floatation portion extending laterally outward from the keel.

24. The snowmobile of claim 22, wherein each ski includes an outer floatation portion extending laterally outward from the keel.

* * * * *